United States Patent [19]
Magnussen

[11] 3,917,531
[45] Nov. 4, 1975

[54] FLOW RATE FEEDBACK CONTROL CHROMATOGRAPH

[75] Inventor: Haakon T. Magnussen, Pinole, Calif.

[73] Assignee: Spectra-Physics, Inc., Mountain View, Calif.

[22] Filed: Feb. 11, 1974

[21] Appl. No.: 441,371

[52] U.S. Cl............................ 210/101; 210/198 C
[51] Int. Cl.² ........................................ B01D 15/08
[58] Field of Search.............. 210/31 C, 101, 198 C

[56] References Cited
UNITED STATES PATENTS

| | | | |
|---|---|---|---|
| 3,446,057 | 5/1969 | Bakalyaa et al................... | 210/31 C |
| 3,826,373 | 7/1974 | Andreotti....................... | 210/198 C |

*Primary Examiner*—John Adee
*Attorney, Agent, or Firm*—Flehr, Hohbach, Test

[57] ABSTRACT

Apparatus for accurately pumping a chromatograph liquid stream, including a pump, the output of which is taken through a flow transducer for providing flow feedback signals to control circuits driving the pump actuator and thereby eliminate undesired flow rate variations. In multiple stream applications, the apparatus permits accurate control of total composite output of combined flow streams as well as the metering of one component stream with respect to the other in such a way that fluctuations in output composition are minimized.

16 Claims, 4 Drawing Figures

FLOW RATE FEEDBACK CONTROL CHROMATOGRAPH

BACKGROUND OF THE INVENTION

This invention relates to metering pumps, such as are used in operating liquid chromatographs. More particularly, the invention relates to control apparatus for liquid chromatograph pumps or similar devices wherein the flow rate of a single or multiple component stream is accurately controlled to provide a relatively pulse-free output.

In the operation of liquid chromatographs in which one or more liquids are passed through a column, it is necessary and desirable to obtain an exact correspondence between a desired volume of flow of a liquid stream through the chromatograph and the actual flow achieved with the pumps used to meter the liquid. Pumps, however, have an inherent fluctuation in flow output due to compliance of seals and compression of the parts in operation. Such fluctuations appear as noise in the output of the chromatograph and deteriorate the quality of the output signal. Fluctuations in pump output are also affected by downstream conditions, such as pressure drop caused by gradient operation, sample injection, packing degradation, packing flow resistance change caused by sample plugging, and the like. Pulse dampeners have been suggested for use in liquid chromatographs to eliminate pulsation in the output flow. However, pulse dampeners, while effective in reducing flow fluctuations, are limited to a fairly narrow range of operating pressures if they are sensitive, and also contribute a significant dead volume which is difficult to flush out when changing solvents. Carrier liquids pumped into chromatographs are referred to as solvents. At the low flow rates utilized in chromatographs, it is difficult to construct a valve which would be adequate to control flow. Thereafter, it has been found necessary to control the amount of input power available to the pump.

Prior art pumping systems have been utilized to control and program the flow output of multiple component solvent systems as described in U.S. Pat. No. 3,398,689 to Allington and U.S. Pat. No. 3,446,057 to Bakalyar et al. Additional proportioning systems are disclosed in the Blume U.S. Pat. No. 3,304,869, Sinclair U.S. Pat. No. 3,250,218 and Dinkelkamp U.S. Pat. No. 3,223,040. Disadvantages of these prior art systems lie in the utilization of motor velocity feedback control systems which monitor the output of the motor drive means and are not responsive directly to the liquid flow in the output stream. These systems are completely unresponsive to fluctuations in liquid flow within each pump cycle. Existing dual reciprocating piston pumps have the capability of producing theoretically non-fluctuating liquid flow if various factors are ignored such as liquid compressibility and compliance of the pumping chamber parts and seals. These factors cause a loss in flow during each pump stroke which results in flow fluctuations within each reciprocation cycle.

These flow fluctuations are undesirable in single pump chromatograph systems because they produce noise in the detectors commonly used. In multiple stream chromatograph systems in which two or more liquid streams are combined in varying proportions to vary the eluting solvent composition during the chromatographic process, the flow fluctuations produced by each pump cause composition fluctuations at the junction where the multiple streams are combined. These composition fluctuations can cause chromatographic effects which result in increased detector noise levels. There is, therefore, a need for a new and improved flow control system for chromatographs.

SUMMARY OF THE INVENTION AND OBJECTS

In general, it is an object of the present invention to provide a flow rate feedback control circuit and pumping system for a chromatograph which will overcome the above limitations and disadvantages.

Another object of the invention is to provide a chromatograph constructed in accordance with the present invention having small dead volume thereby facilitating change of solvents, and operability over an entire range of desirable pressures with substantially constant sensitivity.

Another object of the invention is to provide a multiple component chromatograph having a programmable solvent control system for independently controlling the composite total flow rate as well as the per cent composition of component solvents of the streams.

Another object of the invention is to provide an automatic calibration circuit responsive to the average pumping motor velocity.

Yet another object of the invention is to provide a flow feedback system which eliminates flow fluctuations due to compliance of the pumping chamber parts and seals and compressibility of the solvent.

In order to achieve the foregoing, the invention provides apparatus for measuring the flow rate in the pumped stream and for providing a flow feedback control signal to the pump control electronics of each motor. The flow feedback signal is compared with a reference flow rate control signal supplied by the pump control electronics. Deviations of the feedback signal from the flow rate control signal are used to drive the pump motor means. The pumping actuator velocity is varied to eliminate fluctuations in the desired flow rate resulting in an accurately metered flow, without flow fluctuations otherwise inherent in each cycle of the pump action.

An additional feature of the invention lies in the automatic calibration circuitry for establishing the correct flow feedback reference value for any liquid pumped. This circuitry permits changing the pumped solvent regardless of changes in solvent viscosity which will effect the calibration of the flow feedback system.

BRIEF DESCRIPTION OF THE DRAWINGS

These and other object of the invention are explained in relation to the preferred embodiment illustrated in the drawings wherein.

DESCRIPTION OF THE PREFERRED EMBODIMENTS

Figure 1:
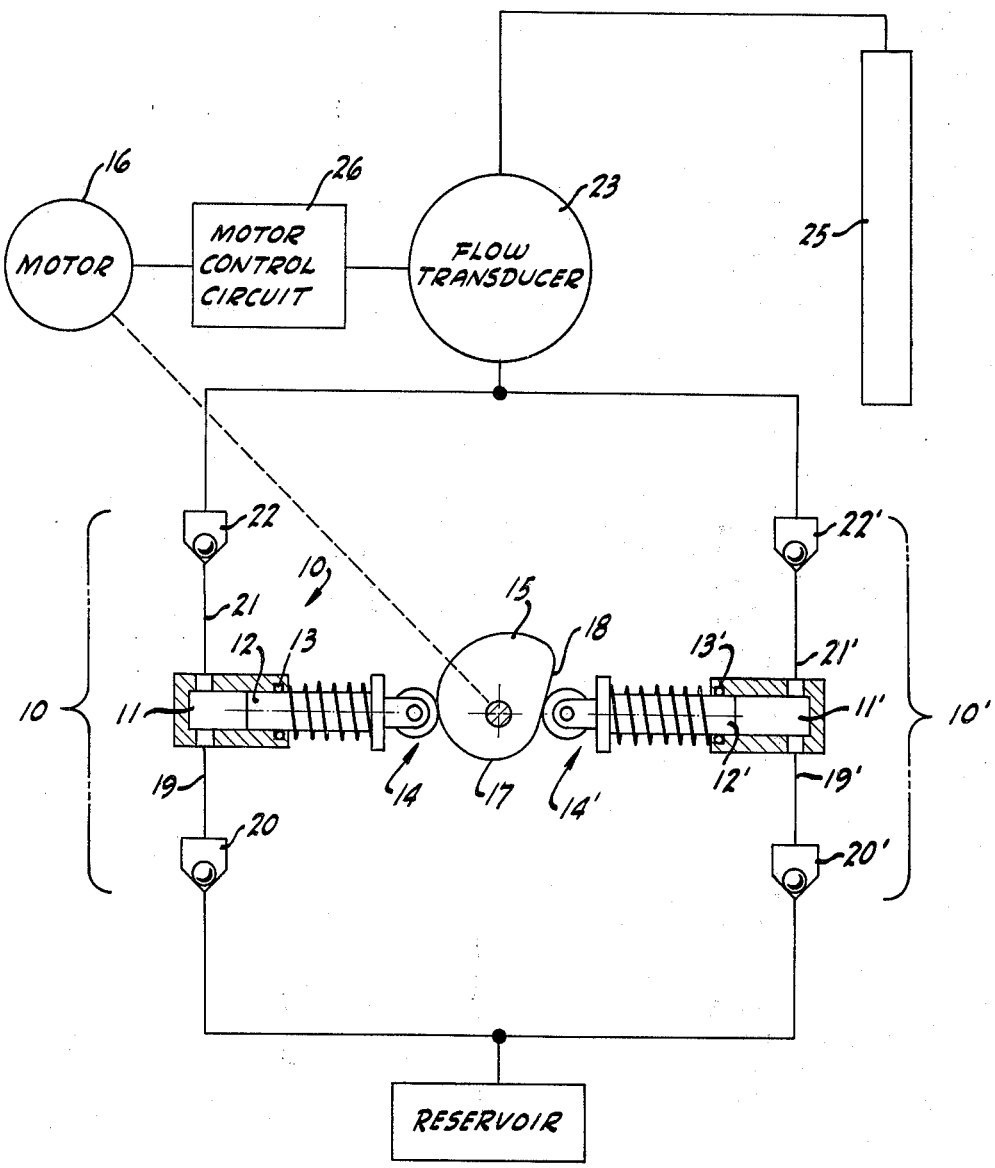
FIG. 1 is a schematic diagram of a flow rate feedback controlled chromatograph metering pump constructed in accordance with the present invention.

Referring to FIG. 1, one chromatograph metering pump and associated connections constructed in accordance with the present invention are shown in schematic form and consists of a pair of opposed piston pumps 10, 10', including chambers 11, 11' through which extend suitable pistons 12, 12' having passed through seals 13, 13'. The pistons are connected through cam followers and rollers 14, 14' into driven engagement with a cam 15 rotated by motor 16. As shown, a typical arrangement consists of at least two reciprocating piston pumps of the type shown, normally positioned 180° opposite from each other about the cam so that the pumps operate 180° out of phase from each other. The cam 15 is provided with one segment 17 which is gradually increasing and provides for the pumping cycle, and with a second segment 18 which abruptly decreases to provide for the filling cycle. The inputs 19, 19' to the pumps are connected in parallel, normally through check valves 20, 20' to the inlets of the respective chambers, while the outlets 21, 21' thereof are connected in parallel through check valves 22, 22' to flow transducer 23. The liquid output from the flow transducer is delivered to a chromatograph column 25. The flow transducer provides an output signal which is passed through pump actuator control means 26, the latter serving to control the drive output of motor 16.

In typical operation, such a dual reciprocating piston pump has a fairly constant output, but there is an overriding fluctuation caused by the compliance of the seals, the solvent and general system compliance which causes the combined output from the pumps to have pulse-like fluctuations particularly in the transmission from the filling cycle to the pumping cycle. The present invention eliminates such pulses, and, therefore, provides extremely low noise level possibilities for the detector which senses the transmissivity of the output of the chromatograph.

Figure 2:
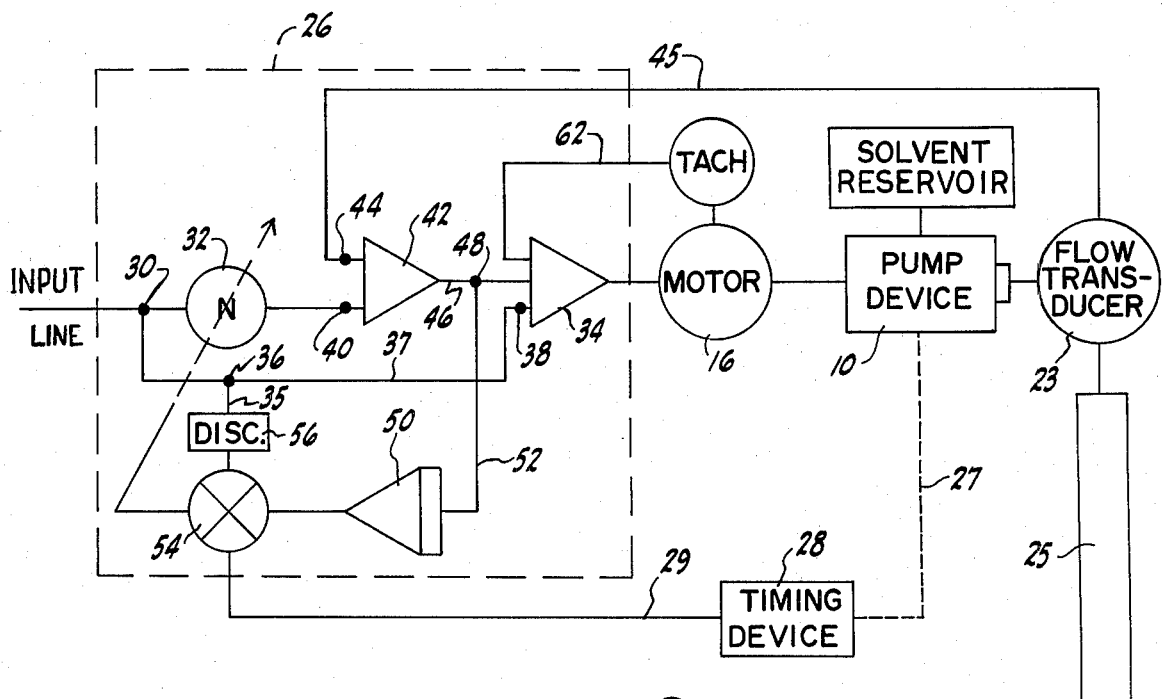
FIG. 2 is a detailed block diagram of the motor pump control system of FIG. 1.

FIG. 2 illustrates the pump control electronic means 26. The solvent flow rate is determined by the flow rate control signal fed to the pump control electronic means along input line and to a terminal 30 and subsequently to a multiplier 32. The control signal from terminal 30 is also fed to an operational amplifier 34, by means of line 37 and terminal 38. The output from multiplier 32 is connected to one input 40 of a differential amplifier 42. The second input 44 to the differential amplifier 42 is connected to the flow feedback signal from the flow transducer 12 on line 45. The output of the differential amplifier 42 is connected to the operational amplifier 34 by means of a conductor 46 through a terminal 48. The differential amplifier 42 provides a flow correction error signal to the operational amplifier 34 for use in powering driving motor means 10. The error signal on conductor 46 is also fed to an integrator 50 via the terminal 48 and a line 52. The output of integrator 50 is fed through a reference gate 54 to control the multiplication factor of multiplier 32. Reference gate 54 is controlled by the solvent programmer control signal from terminal 30 along line 35, terminal 36 and through a voltage discriminator 56. A second input to the reference gate 54 is provided by a timing signal from pump 10 via mechanical coupling 27, timing device 28 and line 29. A motor tachometer 61 is connected to the operational amplifier 34 by means of conductor 62.

In operation, the flow rate control signal is multiplied by a factor N in the multiplier 32 and subsequently compared to the flow feedback signal provided by the flow transducer 12. The factor N is previously calibrated to the flow feedback signal from the flow transducer. The comparison is made in the differential amplifier 42 which provides a flow correction error signal along line 46 to the operational amplifier 34. Operational amplifier 34 sums the flow rate control signal at terminal 38 with the flow correction error signal from differential amplifer 42. The output signal of operational amplifier 34 is used for controlling the speed of drive motor means 15. The pump device 10 is thus driven to force solvent from the reservoir to the output ports of the pump through the flow transducer 12 and to its outlet. Because of the feedback loop, the pump device 1 is driven at whatever speed is required to produce a flow rate which is proportional to the flow rate control signal. In effect, the feedback loop supplements the flow rate control signal to increase or decrease the drive motor speed to achieve a linearity between the flow rate and the control signal. If no flow feedback loop were present, the fluctuations in flow rate due to compliance losses would not be eliminated.

In order to set the multiplier with the correct value of N (the multiplication factor), the flow rate control signal is set to a value greater than or equal to 75 per cent of its maximum value to insure high speed pump operation. It is an advantage to use this high value of motor speed since the relationship between the speed of the drive motor and the flow rate can be inaccurate at low flow rates due to check valve leakage and other factors.

During a portion of the pump stroke, after the piston has travelled far enough to pump up all of the compliance, there exists a well defined relationship between the drive motor velocity and the absolute flow rate. Therefore, during this portion of the stroke an absolute calibration may be assigned to the flow transducer signal based on the drive motor velocity.

A timing cam on the pump drive shaft is used to give an electrical signal during this accurate portion of the piston stroke. This timing device is, therefore, synchronized with the pump stroke by the coupling 27 to the pump drive shaft. The timing device 28 feeds a signal to the gate 54 only during the accurate portion of the piston stroke. Reference gate 54 acts as an AND gate in that it opens only when the timing signal is present and when a signal is passed from the voltage discriminator 56, indicating that the flow rate control signal is at least 75 per cent of its maximum value. When the reference gate 54 is open, it passes signals from the integrator 50 to allow adjustment of the multiplication factor in response to the average value of the flow correction error signal. During this calibration interval the value of N is automatically adjusted such that the average value of the flow correction error signal is equal to zero. In this manner N is calibrated to an absolute flow rate, since the velocity of the drive motor is accurately proportional to the flow rate during the timing interval.

After the reference signal from timing device 28 ceases, the reference gate 54 is closed and the value of N is no longer adjusted. A new adjustment will be made on each successive pump cycle so long as the solvent control signal is at least 75 per cent of its maximum value. If the solvent control signal is reduced below 75 per cent of its maximum value, the adjustment ceases to take place. Thus the calibrated value of N is always obtained at high flow rates where errors due to check valve leakage are minimal.

With the correct calibrated value of N established, the flow correction error signal together with the flow rate control signal, both signals being added in the operational amplifier 34, provides a proportional value of the flow rate. The flow rate control signal can be varied in any manner and the pump outlet flow rate will respond accordingly. If the solvent pumped is changed to a new one with different viscosity, the calibrated value of N will no longer be correct, but it can be automatically recalibrated by turning the flow rate control to at least 75 per cent of its maximum value for a brief period in order to allow a new calibration action to take place.

Figure 3:
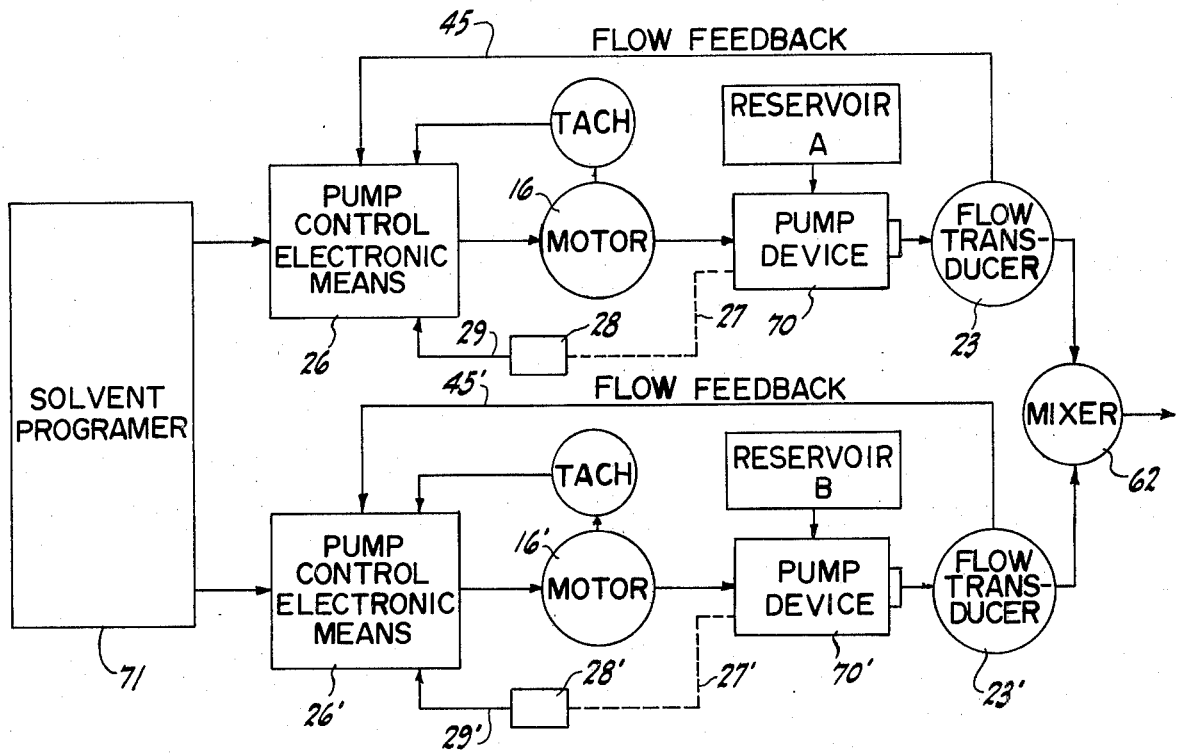
FIG. 3 is a block diagram of a two-pump system with a solvent programmer which forms an apparatus for mixing two pumped liquids and varying the composition of the mixture in a controlled manner constructed in accordance with the present invention.

It is obvious that the above described flow system may readily be extended to include a large number of streams connected together to form a single flow stream with separate control signals for controlling the relative composition of each component solvent. It is common practice to use two streams. FIG. 3 illustrates such a system comprising two pumps 70 and 70' and a solvent programmer 71 which provides output electrical signals for controlling the total flow rate of the chromatograph output as well as the relative composition of the two solvent streams which are combined in a mixer 72. The solvent programmer also contains time varying control circuits to provide for gradient operation of the chromatograph in which the percentage of one solvent relative to the other is varied over a preset interval of time. An example of a programmable gradient control means is illustrated in the Allington U.S. Pat. No. 3,398,689.

The flow feedback used in each of the two pumps has a particular advantage in solvent programming or gradient control systems because flow fluctuation in each stream causes composition fluctuations in the combined stream. These composition fluctuations cause spurious detector response in the chromatograph.

Figure 4:
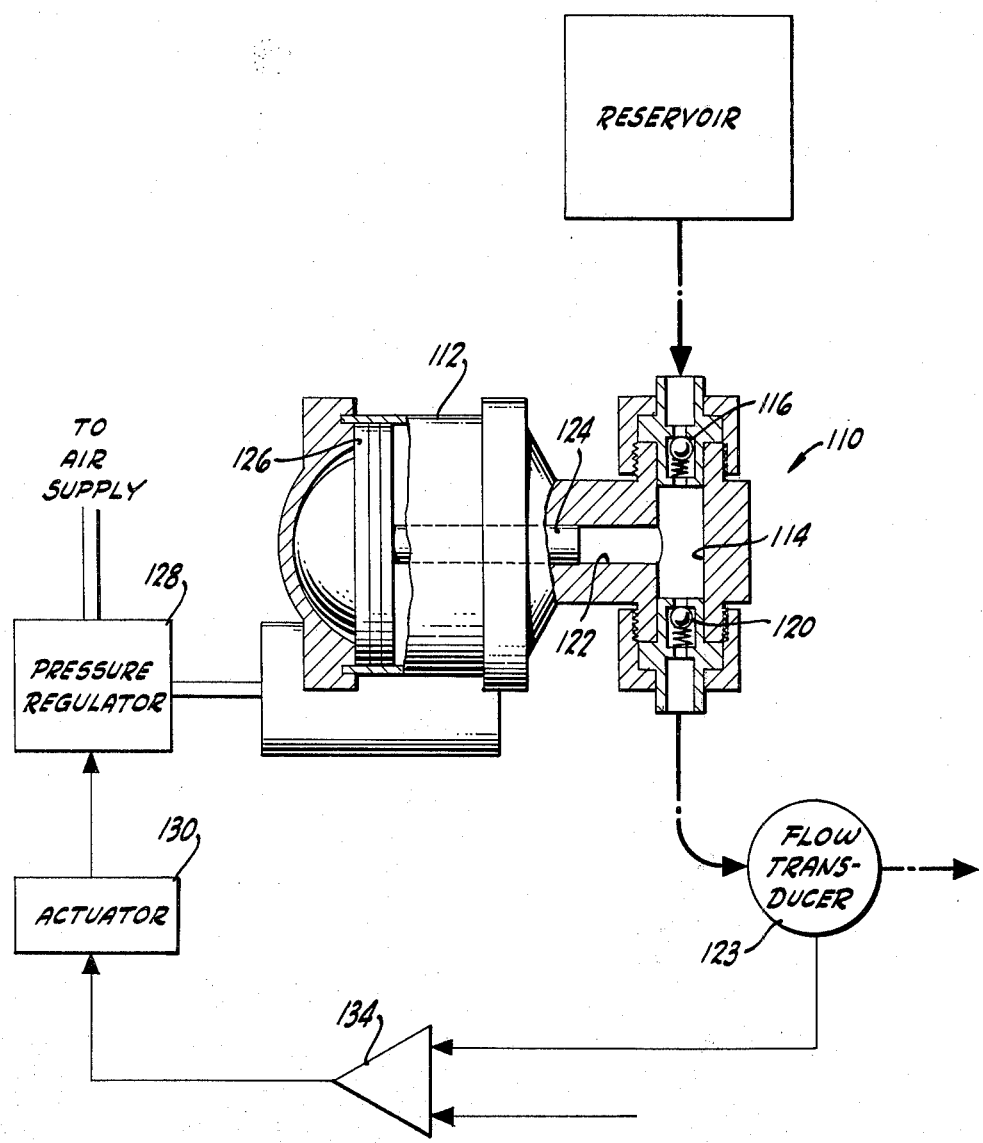
FIG. 4 is a schematic diagram of an alternate embodiment of the invention utilizing an air driven piston pump.

Referring now to FIG. 4, there is shown another embodiment constructed in accordance with the present invention which utilizes a single reciprocating piston pump 110 driven by a continuously cycling double-acting air driven cylinder 112. An example of such a pump is as shown in U.S. Pat. No. 3,174,409, entitled "Pumps and Regulating Means Therefor", issued Mar. 23, 1965. The pump 110 includes a liquid pump chamber 114 which is connected to a reservoir of liquid through a check valve 116. The outlet is connected to a flow transducer 118 and is also provided with a suitable check valve 120. The liquid pumping portion of the valuve consists of the cylindrical chamber 114 within the pump body which is intercepted by a filling bore 122 which opens transversely into the chamber. A hydraulic plunger 124 is slidably inserted through one end of the bore and adapted for movement towards and away from the filling chamber. The hydraulic plunger is attached to an air piston 126 of much larger area which is mounted for reciprocation in an air drive barrel. The operating cycle of the pump is such that as air is admitted into the barrel at the head of the piston, it drives the air piston and hydraulic plunger together so as to reduce the volume in the filling bore and thus eject liquid through check valve 120. At the end of the pumping stroke the air piston is automatically and rapidly returned to open the filling bore and thus cause the liquid from the reservoir to enter the pump chamber. The filling stroke is made automatically and is rapid compared to the pumping stroke so that a minimum of time is spent in filling the pump. The rate of operation of the pump is controlled by a pressure regulator 128 in series with the air supply and the pump. Pressure regulator 128 is operated by an actuator 130 which is electrically sensitive to the difference comparator 134, the input of which connected to the output of flow transducer 123 and the other input to a source or demand signal, such as solvent programmer. The operation of this air-operated pump is similar to that previously described in connection with the embodiment of FIG. 1, except that pneumatic control means are utilized to achieve a flow output in response to a predetermined input. When the pump passes through its filling cycle, the flow cannot be maintained, so that the output from the chromatograph will have an intermittent interruption during the filling operation. However, these are readily segregated in the detector output which is otherwise noise free.

The invention herein has been described with reference to electric motor driven pumps and an air driven pump, and with particular reference to the configurations set forth. But, it should be understood that various modifications can be made which are within the spirit and scope of the invention. For example, while there is disclosed herein the use of a flow transducer located in the output circuit of the pump, it is obvious that the flow through the pump for incompressible liquids is uniform, both in the inlet and outlet lines, and, therefore, the flow transducer could be incorporated anywhere in that circuit. And, while there is disclosed two specific preferred forms of the invention, one utilizing an electric motor driving a cam operated pump and another utilizing an air driven pump, it is obvious that many types of pumps and associated control circuits may be substituted without departing from the invention.

I claim:

1. In chromatograph apparatus, a chromatograph column, a source of liquid to be passed through said column, pump means connected between said source and said column for delivering said liquid under pressure to said column, drive means for delivering motive power to said pump means, means for detecting flow through said pump and for developing a flow feedback signal in proportion thereto, control means for varying the output of said drive means, said control means including means responsive to said flow feedback signal, and means for comparing said flow feedback signal with a signal representing a predetermined demand value of flow.

2. Apparatus as in claim 1 in which said drive means is an electric motor having a rotary shaft output and further including means for calibrating the flow rate during operation of the pump motor comprising means for sensing the position of the pump piston and for developing a signal when far enough through a stroke to pump up all the compliance of the system, means for developing a second signal when the pump motor drive velocity is in the highest portion of its range, means responsive to the occurence of both signals for varying the gain of said flow rate control means to a predetermined value calibrated on the known relationship between motor speed and flow rate during the interval when both said signals are present.

3. Apparatus as recited in claim 1 wherein said control means comprises a solvent programmer for providing a solvent programmer control signal indicative of a desired flow rate, and circuit means responsive to said solvent programmer control signal and said flow feedback signal for controlling said power means.

4. Apparatus as recited in claim 3 wherein said circuit means comprises a difference amplifier responsive to said solvent programmer control signal and said flow feedback signal for providing a flow correction error signal, amplifying means for receiving said flow correction error signal and said solvent programmer control signal for controlling said power means.

5. Apparatus as recited in claim 4 further comprising a calibration circuit connected for receiving said flow correction error signal from said difference amplifier, and for providing an output signal, a multiplier connected for receiving said solvent programmer control signal and for multiplying said solvent programmer control signal by the output signal of said calibration circuit for providing a multiplied solvent programmer control signal to said difference amplifier.

6. Apparatus as recited in claim 5 wherein said calibration circuit comprises an integrator connected for receiving said flow correction error signal for providing an integrated output signal to said multiplier.

7. Apparatus as recited in claim 6 wherein said calibration circuit further comprises means for connecting said integrated output signal to said multiplier in response to a preset timing signal.

8. Apparatus as recited in claim 6 wherein said calibration circuit further comprises means for connecting said integrated output signal to said multiplier in response to a preset solvent programmer control signal.

9. In a chromatograph, a chromatograph column, a source of liquid for delivery to said column, means for accurately metering said liquid, including a reciprocating dual-piston pump having at least two pistons driven out of phase with each other and provided with a combined output, a flow transducer connected to said output for providing electrical signal proportional to flow rate therefrom, a motor connected to said pump, means for controlling the speed of operation of said motor, said means having one input connected to the output of said flow transducer and being responsive thereto to vary the speed of said motor to cause the flow rate in said output to correspond to a preselected value.

10. In a chromatograph apparatus, a chromatograph column, sources of liquid deliverable as plural streams to said column, means for combining said plural streams to produce a single stream including a plurality of pumps for respectively producing plural component streams, means for merging said plural streams into a single stream, power means for driving each of said pumps, flow measuring means in each of said streams for providing flow feedback signals, means for controlling each of said power means, said controlling means being responsible to said flow feedback signals for controlling said power means in accordance with a predetermined demand function for total flow rate of said single stream and realtive composition thereof from said component streams.

11. Apparatus as recited in claim 10 wherein said control means comprises a solvent programmer for providing a solvent programmer, control signal indicative of a desired flow rate, and circuit means responsive to said solvent programmer control signal and said flow feedback signal for controlling said power means.

12. Apparatus as recited in claim 11 wherein said circuit means comprises a difference amplifier responsive to said solvent programmer control signal and said flow feedback signal for providing a flow correction error signal, amplifying means for receiving said flow correction error signal and said solvent programmer control signal for controlling said power means.

13. Apparatus as recited in claim 12 further comprising a calibration circuit connected for receiving said flow correction error signal from said difference amplifier, and for providing an output signal, a multiplier connected for receiving said solvent programmer control signal and for multiplying said solvent programmer control signal by the output signal of said calibration circuit for providing a multiplied solvent programmer control signal to said difference amplifier.

14. Apparatus as recited in claim 13 wherein said calibration circuit comprises an integrator connected for receiving said flow correction error signal for providing an integrated output signal to said multiplier.

15. Apparatus as recited in claim 14 wherein said calibration circuit further comprises means for connecting said integrated output signal to said multiplier in response to a preset timing signal.

16. Apparatus as recited in claim 14 wherein said calibration circuit further comprises means for connecting said integrated output signal to said multiplier in response to a preset solvent programmer control signal.

* * * * *